United States Patent [19]

Hudgin

[11] 4,278,721
[45] Jul. 14, 1981

[54] THERMAL BARRIER

[75] Inventor: Richard H. Hudgin, Marlboro, Mass.

[73] Assignee: Princeton Polymer, Plainsboro, N.J.

[21] Appl. No.: 69,079

[22] Filed: Aug. 23, 1979

[51] Int. Cl.³ .............................. B32B 3/28; B32B 3/30
[52] U.S. Cl. ...................................... 428/122; 52/795;
126/439; 126/449; 428/167; 428/182; 428/186;
428/332; 428/920
[58] Field of Search .............. 428/122, 182, 184, 186,
428/920, 921, 167, 332; 156/210; 126/449, 439;
52/261, 303–305, 171, 790, 795, 796, 799, 809

[56] References Cited

U.S. PATENT DOCUMENTS

| | | | |
|---|---|---|---|
| 1,444,397 | 2/1923 | Seigle | 428/920 |
| 1,802,522 | 4/1931 | Moll | 428/186 |
| 2,044,731 | 6/1936 | LeGrand | 428/184 |
| 2,045,733 | 6/1936 | Spafford | 154/45 |
| 2,091,918 | 8/1937 | Finck | 154/45 |
| 2,101,836 | 12/1937 | Benedict | 154/45 |
| 2,104,060 | 1/1938 | Spafford | 154/55 |
| 2,190,680 | 2/1940 | Rowe | 154/33 |
| 2,221,309 | 11/1940 | Gazelle | 154/45 |
| 2,406,815 | 9/1946 | Elfving | 428/920 |
| 2,413,331 | 12/1946 | Munters | 154/45 |
| 2,417,435 | 3/1947 | Munters | 154/45 |
| 3,041,219 | 6/1962 | Steck | 154/45 |
| 3,130,112 | 4/1964 | Anderson, Jr. | 161/89 |
| 3,150,576 | 9/1964 | Gewiss | 93/84 |
| 3,265,550 | 8/1966 | Lindquist | 156/210 |
| 3,342,666 | 9/1967 | Hull | 161/135 |
| 3,404,748 | 10/1968 | Bjorksten | 181/33 |
| 3,445,322 | 5/1969 | Saiia et al. | 161/113 |
| 3,540,079 | 11/1970 | Bush | 18/19 |
| 3,669,820 | 6/1972 | Fredericks | 161/68 |
| 3,726,408 | 4/1973 | Gewiss | 210/493 |
| 3,751,325 | 8/1973 | Edkvist | 156/550 |
| 3,785,914 | 1/1974 | King | 161/133 |
| 3,920,496 | 11/1975 | Wilkinson et al. | 428/186 |
| 3,951,129 | 4/1976 | Brantley, Jr. | 126/271 |
| 3,975,882 | 8/1976 | Walter | 52/571 |
| 4,028,252 | 6/1977 | Morris | 264/286 |
| 4,035,539 | 7/1977 | Luboshez | 428/178 |
| 4,046,133 | 9/1977 | Cook | 126/270 |
| 4,062,346 | 12/1977 | Rapp et al. | 126/270 |
| 4,078,544 | 3/1978 | Hollands et al. | 126/271 |
| 4,120,283 | 10/1978 | Eder | 126/270 |
| 4,126,014 | 11/1978 | Kay | 62/2 |
| 4,132,581 | 1/1979 | Swartz | 156/210 |

*Primary Examiner*—Paul J. Thibodeau
*Attorney, Agent, or Firm*—Cushman, Darby & Cushman

[57] ABSTRACT

A thermal barrier having a corrugated structure which eliminates convection losses and greatly reduces conduction losses. The invention relates to various methods of reducing infra-red radiation loss. The channels formed by the corrugations have a length much greater than their thickness. In one embodiment, grooves are provided in the sheet forming the corrugations. In another embodiment, an infra-red absorptive coating is applied to the sheet forming the corrugations. In the third embodiment, infra-red scattering material is disposed in the channels of the corrugated material.

33 Claims, 5 Drawing Figures

THERMAL BARRIER

The present invention relates to a thermal barrier, and more particularly to a thermal barrier incorporating corrugated material.

From any heated body, energy can be lost by at least three processes. Convection currents carry air or any fluid heated by the body away from the body. Heat conducts through contiguous material away from the heated body. Finally, the heated body radiates infra-red radiation.

It has been well-known that stagnant air is a very good insulator which can significantly reduce conduction losses. For this reason, corrugated structures are well-known for their good insulating characteristics. The channels formed by the corrugated material maintain the air therein stagnant. Therefore, energy losses due to convection and conduction can be significantly reduced.

A number of U.S. patents teach the use of corrugated material as insulation:
U.S. Pat. No. 4,035,539—Luboshez (1977)
U.S. Pat. No. 3,975,882—Walter (1976)
U.S. Pat. No. 3,726,408—Gewiss (1973)
U.S. Pat. No. 3,669,820—Fredericks (1972)
U.S. Pat. No. 3,445,322—Saiia et al (1969)
U.S. Pat. No. 3,404,748—Bjorksten (1968)
U.S. Pat. No. 3,130,112—Anderson (1964)
U.S. Pat. No. 3,041,219—Stack (1962)
U.S. Pat. No. 2,417,435—Munters (1947)
U.S. Pat. No. 2,413,331—Munters (1946)
U.S. Pat. No. 2,221,309—Gazelle (1940)
U.S. Pat. No. 2,104,060—Spafford (1938)
U.S. Pat. No. 2,101,836—Benedict (1937)
U.S. Pat. No. 2,091,918—Finck (1937)
U.S. Pat. No. 2,045,733—Spafford (1936)
U.S. Pat. No. 1,802,522—Moll (1931).

Insulation of the solar window in solar energy collection devices also produces advantageous results. Unless insulation is provided, energy can escape almost as easily as it was captured. The insulated solar window must be transparent to sunlight, while still reducing the three types of losses discussed above. Obviously, stagnant air is highly transmissive to sunlight while also being a good insulator.

The use of corrugated structures in solar collectors is also well-known as indicated in the following patents:
U.S. Pat. No. 4,126,014—Kay (1978)
U.S. Pat. No. 4,120,283—Eder (1978)
U.S. Pat. No. 4,078,544—Hollands et al (1978)
U.S. Pat. No. 4,062,346—Rapp, Jr., et al (1977)
U.S. Pat. No. 4,046,133—Cook (1977)
U.S. Pat. No. 3,951,129—Brantley, Jr. (1976).

The present invention employs a corrugated structure having a high aspect ratio for use either as insulation or the window of a solar collector. In fact, the present invention may be applied to the window of any structure to permit the entry of sunlight, while prohibiting heat loss.

"High aspect ratio" means that the channels formed by the corrugations have a length much greater than their thickness. It is preferred that the length of each channel be four to twenty times greater than the thickness. The present inventor has discovered that the large aspect ratio significantly reduces infra-red radiation, since most of the infra-red energy radiated from a side wall of the corrugated structure is re-absorbed by the opposite side wall and not released to the outside.

The present inventor has discovered that it is particularly advantageous to reduce infra-red radiation in other manners also. In one embodiment of the invention, grooves are provided in the side walls of the channels of the corrugated sheet to facilitate re-absorption (rather than reflection) of the infra-red radiation.

In addition, coatings may be applied to the corrugated material to enhance re-absorption of the infra-red radiation. In an alternative embodiment, infra-red radiation scattering material is disposed within each channel of the corrugated material to decrease the energy loss through infra-red radiation.

If the thermal barrier of the present invention is to be used as insulation, the corrugated sheet may be paper. Furthermore, grooves in the walls of the channels can run parallel to the corrugations. This arrangement maximizes the re-absorption of infra-red radiation. If the thermal barrier of the present invention is employed as solar insulation, either for the windows of a structure or the window of a solar collector, the corrugated sheet may be a clear plastic. In this embodiment, it is advantageous to have grooves running perpendicular to the corrugations. This enhances the transmission of light down the corrugation channels and through the thermal barrier, while improving the re-absorption of infra-red radiation over smooth-walled channels.

Thus, the corrugations of the present invention stagnate a mass of air, eliminating convection currents and greatly reducing energy losses through conduction. The high aspect ratio of the corrugation channels, grooves in the walls of the corrugation channels, coatings on the corrugated sheet and/or the placement of infra-red scattering material in the corrugation channels greatly reduces energy loss through infra-red radiation.

As a result, a 6-inch thermal barrier according to the present invention should provide the same degree of insulation as 6 inches of fiberglass at a fraction of the cost.

These and other objects and advantages of the invention will become more apparent and more readily appreciated from the following detailed description of the presently preferred exemplary embodiments of the invention taken in conjunction with the accompanying drawing, of which:

Figure 1:
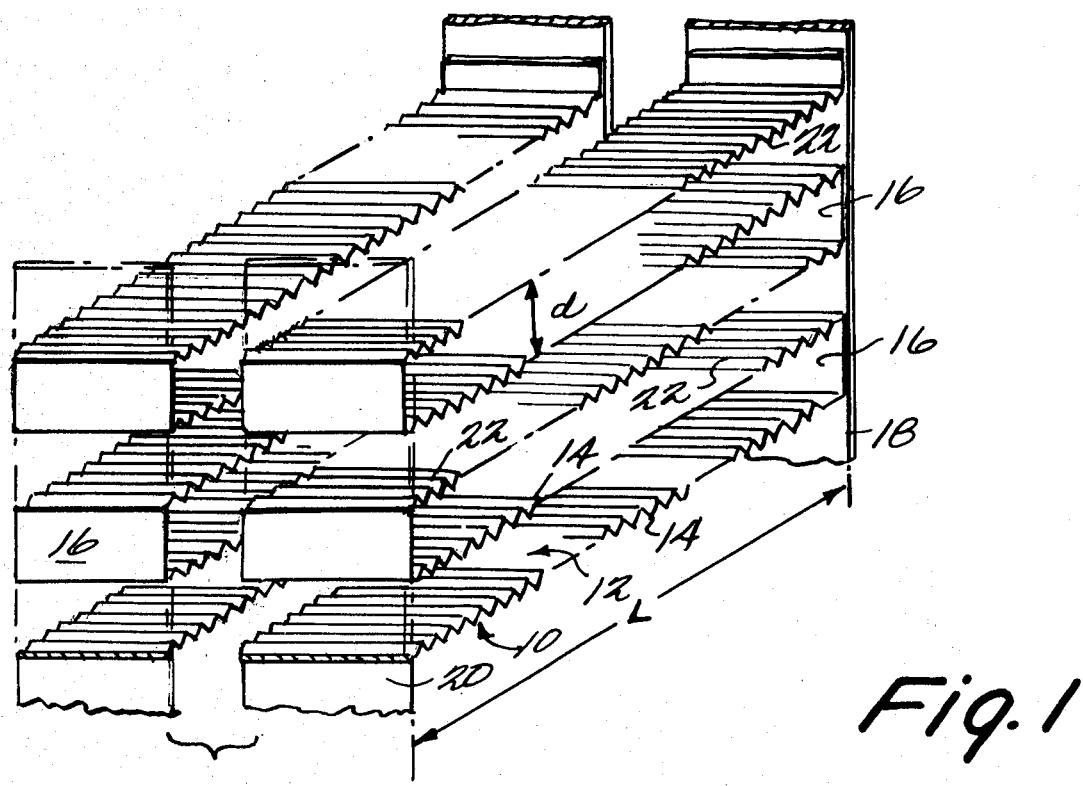
FIG. 1 is a fragmentary perspective view of one embodiment of the present invention.

In FIG. 1, sheet 10 is corrugated so as to form channels 12 having side portions 14 and bottom portions 16. Cover sheet 18, attached to one set of bottom portions 16 and cover sheet 20 attached to the other set of bottom portions 16 provide means for preventing convection between channels. Cover sheets 18 and 20 need not be attached to bottom portions 16. In fact, a gap can exist between bottom portions 16 and sheets 18 and 20 as long as the gap is sufficiently small to inhibit convection between channels 12.

The corrugated structure as described above, can completely suppress all convection currents. The convecting air circulating in a single channel 12 receives its energy from the density difference caused by a temperature differential in the air mass. This energy is dissipated by the viscosity of the air as the air shears against side portions 14 and itself. This viscous loss is proportional to the convection velocity squared ($v^2$), while the gravitational drive power is proportional to velocity (assuming complete heat exchange at the hot and cold surfaces).

If the gravitation power is Av and the viscous loss is $Bv^2$, then equilibrium between them gives a convection velocity A/B. This is a simplistic model, since greater accuracy demands the use of a velocity distribution, but the physics of a more detailed analysis are well-known.

When the effects of thermal conduction are added, the results change greatly. The thermal conduction between the rising hot air and the sinking cold air effectively shorts out the gravitational drive for the convection. The gravitational power becomes proportional to $v^2$ instead of v (when the convection rate becomes low). If $Av^2$ is gravitational power in this limit, then convection occurs only if A is greater than or equal to space. As mentioned above, stagnant air is a particularly good insulator against static conduction.

Figure 2:
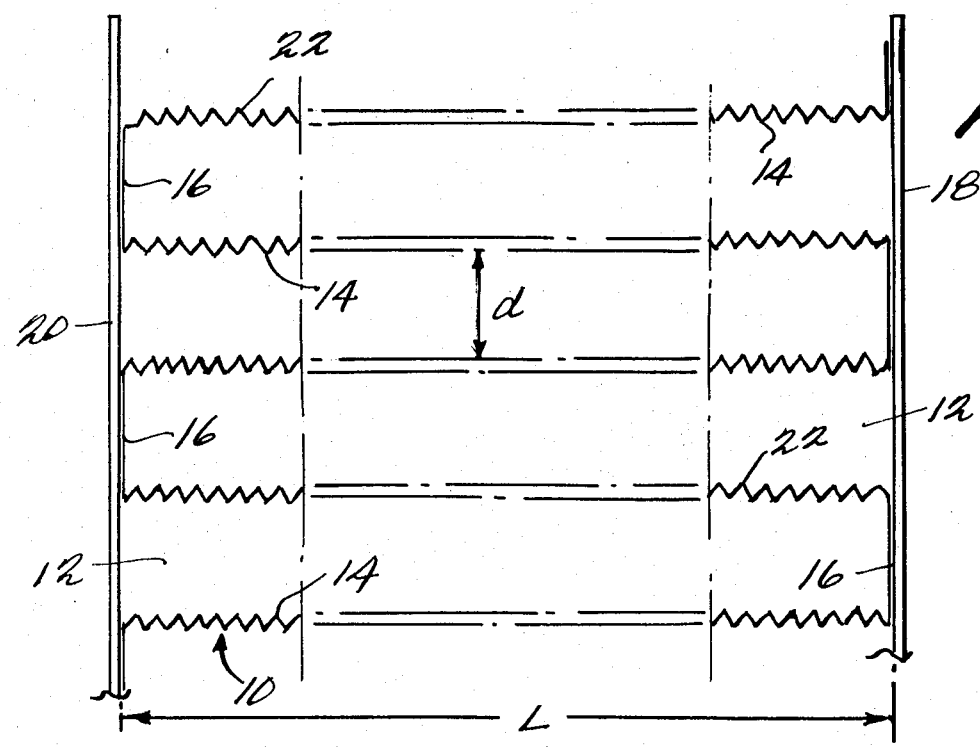
FIG. 2 is a side view of the embodiment of FIG. 1.

It will be noted from FIGS. 1 and 2 that length L of the corrugation is many times greater than thickness d of the corrugation channel. In fact, in the preferred embodiment, length L is four to twenty times greater than thickness d. The present inventor has discovered that this high aspect ratio design is an extremely effective barrier to infra-red losses, which is critical for any good insulation. The infra-red barrier comes about because any radiation from a side portion 14 hits the opposite side portion 14 and is re-absorbed. Thus, the only infra-red radiation loss is the little radiation which escapes out the end of the channel. For a corrugation channel of thickness d, the RMS shift in position between emission and hitting the opposite wall is only d/2. Thus, on the average, one can think that the radiation is absorbed and re-emitted every d/2 distance through the insulation. This effect, included with the direct radiation from the bottom, causes IR losses to be reduced from a hot source by a factor T:

$$T = \left[ \frac{2}{\pi} + \frac{1}{8}\left( \ln\left( \frac{2L}{d} + \sqrt{1 + 4L^2/d^2} \right) - \frac{1}{\sqrt{1 + d^2/4L^2}} \right) \right] \frac{d}{L} \approx \frac{d}{L}$$

B. Since the gravitational power is proportional to the temperature differential ΔT, one can always decrease ΔT until A is less than B, whereupon convection stops.

Also, A and B are determined by the geometry of the cell, and one can design channel 12 to withstand an arbitrarily large ΔT without convecting. It has been mathematically determined that for channel 12, convection does not occur as long as:

Gβd²LΔT/Kv ≦ 80 wherein
G = acceleration of gravity;
β = coefficient of thermal expansion of air;
d = thickness of corrugation channel;
ΔT = temperature differential;
K = thermal conductivity/density × specific heat;
v = kinetic viscosity;
L = length of corrugation channel.

For air in normal gravity around 0° C., this relationship becomes d²LΔT ≦ 1.4 × 10⁻⁴ m³°C.

In practice, for a 60° C. temperature differential between the inside and outside of a house (72° F. inside to −30° F. outside), convection will not occur as long as:

d²L ≦ 2.3 × 10⁻⁶ m³

If L is 15 cm. (6"), then the thickness d of corrugation channels 12 must be less than or equal to 0.39 cm. If L 10 cm. (4") then convection is stopped if the corrugation thickness d is less than or equal to 0.5 cm. However, if the insulation is made in three corrugated layers cm. (2") thick, then the thickness d in each corrugation layer must be less than or equal to 0.68 cm. Employing three corrugated layers 5 cm. thick with the thickness d equal to 0.68 cm., rather than a single corrugation layer 15 cm. thick with thickness d equal to 0.39 in. will use only two-thirds of as much material.

With convection arrested, one need only consider static thermal conduction and infra-red radiation. The static conduction can be through the walls or the air With a corrugation thickness of 1 cm. and length of 6 inches (15 cm.), the infra-red transmission is only 6.7%, from this equation, if side portions 14 are perfectly absorbent. In practice, the rays at grazing incidence are largely reflected (the standard reflection at a dielectric interface) which reduces the effectiveness of the insulation. Since the majority of the rays emitted by a surface are at grazing incidence this effect is quite significant. Infra-red transmission may be three times the predicted value due to reflection at small angles.

In fact, with smooth walled, corrugated insulation with channel 12 thickness d of 1 cm. and insulation length L of 4 inches (10 cm.), a K factor (thermal conductivity) of 0.85 BTU/hour feet² (°F./in.) was measured, while the predicted K factor was 0.4 BTU/hour feet² (°F./in.). Further experiments indicated no convection, so that the losses were entirely due to small angle infra-red reflection.

To overcome this problem, grooves 22 are provided in corrugated sheet 10 running parallel to the corrugations. In the preferred embodiment, these grooves are accordion-like creases in sheet 10. The amplitude of grooves 22 may vary from several wavelengths (of IR radiation) to greater than thickness d of channels 12. In the preferred embodiment, grooves 22 have an amplitude of between 0.1 mm to 1 cm. As a result of grooves 22, grazing rays strike the projecting pieces of side portions 14 more perpendicularly, thus increasing absorption and decreasing reflection.

The orientation of grooves 22 parallel to the corrugations, as illustrated in FIGS. 1 and 2, results in the maximum re-absorption of infra-red radiation. Possible uses for the insulation of this embodiment are: (1) insulation in the walls of buildings; (2) clothing insulation; (3) sleeping bag insulation; or (4) insulation for boots. When used for these purposes, corrugated sheet 10 and cover sheets 18 and 20 may be paper.

In the embodiment illustrated in FIGS. 1 and 2 which stops all convection, one is left with three sources of heat transfer: air conduction, side wall conduction, and IR losses. These are additive effects so that the total K factor is the sum of the individual K factors. One can calculate these individual values to be:

$K_{air} = 0.157$
$K_{sw} = 0.001$ $$K_{IR} = \frac{\delta(T_{hot}^4 - T_{cold}^4)}{(T_{hot} - T_{cold})} d = .246\, d$$

where perfect infra-red absorption is assumed, $\delta$ is the Stephan-Boltzman constant, $T_{hot} = 290°$ K., $T_{cold} = 250°$ K., and thickness d is in centimeters.

Thus the total K factor is:

$K_{total} = 0.158 + 0.246\, d$

For d=0.5 cm., K=0.28 (assuming side walls 14 are perfect infra-red absorbers), which is better than the K value for standard fiberglass insulation. Since it is desirable for width d to equal 0.4 cm. so that all convection stops, a good estimate for the final K value is K=0.256. This provides some leeway for imperfect side walls while still retaining a K factor better than fiberglass.

Instead of paper, sheet 10 and cover sheets 18 and 20 may be made of a clear plastic. When clear plastic is employed, the present invention may be utilized as a cover for the window of a solar collector, or a cover for windows in a structure. However, when side portions 14 have grooves 22 oriented parallel to the corrugations as illustrated in FIGS. 1 and 2, sunlight transmission will be reduced since the rays will scatter off grooves 22 instead of bouncing down the channels.

Figure 3:
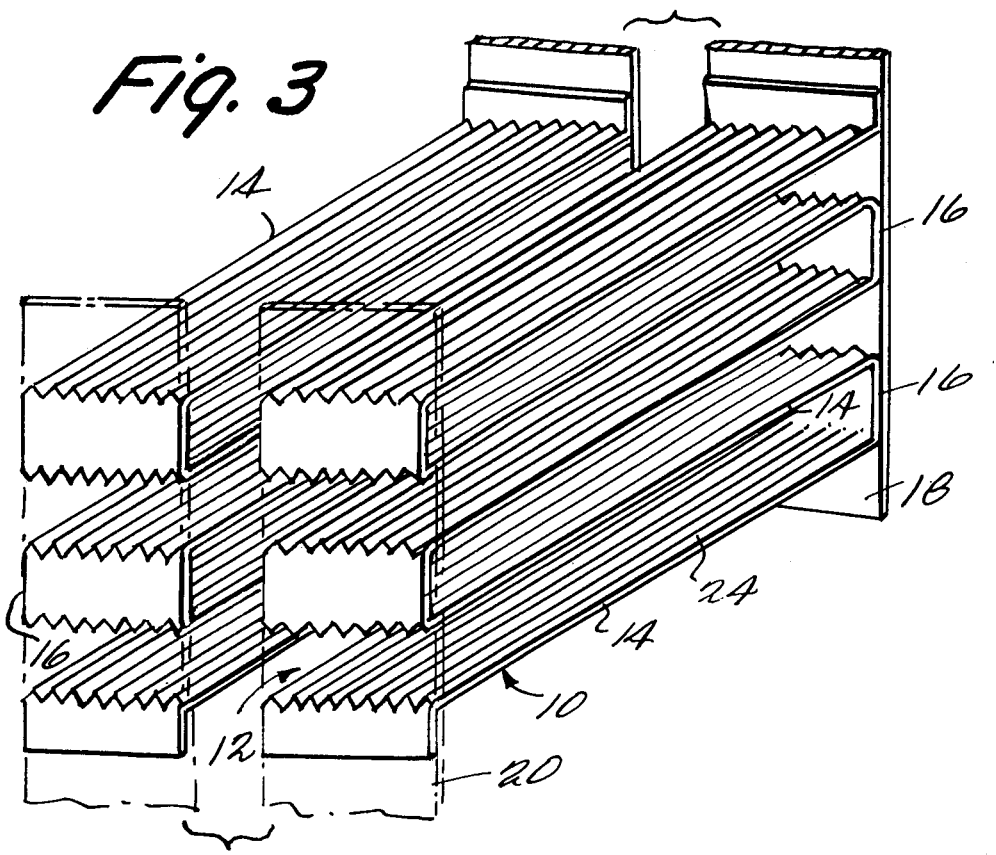
FIG. 3 is a fragmentary perspective view of a second embodiment of the present invention.
Figure 4:
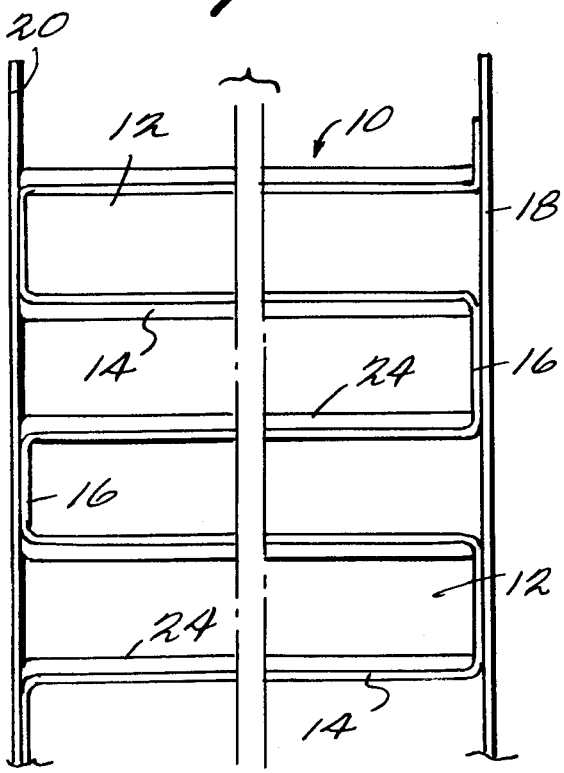
FIG. 4 is a side view of the embodiment of FIG. 3.

To overcome this problem, the embodiment of the present invention illustrated in FIGS. 3 and 4 may be employed. Sheet 10 is again corrugated, with the corrugations having a high aspect ratio. Channels 12 formed by the corrugations of sheet 10 have side portions 14 and bottom portions 16. Cover sheets 18 and 20 are attached to bottom portions 16.

In the embodiment illustrated in FIGS. 3 and 4, sheet 10 also has accordion-like creases forming grooves. However, grooves 24 run perpendicular to the corrugations of sheet 10. The amplitude of grooves 24 may vary from several wavelengths to greater than thickness d of channels 12. In the preferred embodiment, grooves 24 have an amplitude of between 0.1 mm to 1 cm.

This particular embodiment is particularly useful as solar insulation. In this embodiment, light travels from the outside along grooves 24, into the structure being insulated. On the other hand, grazing infra-red rays tend to strike grooves 24 more orthogonally to enhance absorption and decrease reflection.

When the present invention is being employed as solar insulation, solar transmission is a critical parameter. When the sun's rays are aligned with side portions 14, the maximum transmission is produced. This transmission is 89% for a single corrugation and 83% for a two-layer corrugation. The loss of transmission from 100% is caused by reflections of 2.7% at each air-plastic interface.

One advantage of a corrugated window as illustrated in FIGS. 1-4 is that the front cover 20 may be moved up or down relative to the back cover 18 to align the corrugation channels with the direction of peak sunshine.

As mentioned above, this embodiment is ideally suited to cover the window of a solar collector or the windows of a structure generally. In fact, cover sheet 18 may actually be the sheet of glass forming the window with bottom portions 16 attached thereto.

The use of the present invention on the windows of heated structures would greatly reduce energy consumption. About 75% of the heat loss in a building comes from windows. A building which uses the solar insulation of the present invention on one-half of its windows should save roughly 34% of its heating costs while still retaining the benefits of sky lighting. Covering all of the windows should save 68% of the heating costs.

The problem of infra-red grazing reflection can also be controlled by the selection of the material of side portions 14. The ideal material is perfectly transparent to radiation having a wavelength of 0.35 to 0.8 microns (visible light) and totally absorbing from 0.8 to 1000 microns (infra-red). Inexpensive substances of this type do not exist although some plastics such as Mylar are fairly good in 5 mil. thicknesses. The design can be optimized much better with reduced cost if side portions 14 are freed from the constraint of being infra-red absorbent.

Material costs can be cut by 60-80% or more if 1 to 2 mil Mylar is used for side portions 14 instead of 5 mil Mylar (the cost per pound is the same independent of film thickness). Infra-red absorbence can be restored by dip coating sheet 10 in an IR absorbing material which would potentially give both a higher transmission of sunlight and a higher absorbence of infra-red radiation.

Water has very good properties in this regard. Water is fairly transparent at 0.5 microns (visible light), with a knee in the transparency curve for radiation having a wavelength of 1 micron, so that a 2-mil layer of water is 99% absorbent to radiation having a wavelength between 5 and 15 microns. Thus, if one could coat sheet 10 with water and keep it there, the result would be ideal. To accomplish this, a hydrophilic plastic may be employed. As is known in the art, a major component of hydrophilic plastics is water. Thus, a coating of hydrophilic plastic would accomplish the desired result.

Furthermore, a hydrophilic plastic coating would produce an excellent fire retardant material, since every mil or two of plastic would have several mils of water on it.

When sheet 10 is dip coated with hydrophilic plastic, its absorption characteristics greatly reduce the need for grooves 22 or 24. On the other hand, a combination of grooves 22 or 24 and a coating of hydrophilic plastic would produce even better results. Obviously any material employed as corrugated sheet 10 may be coated with infra-red absorbing material with a resulting increase in insulation efficiency.

Figure 5:
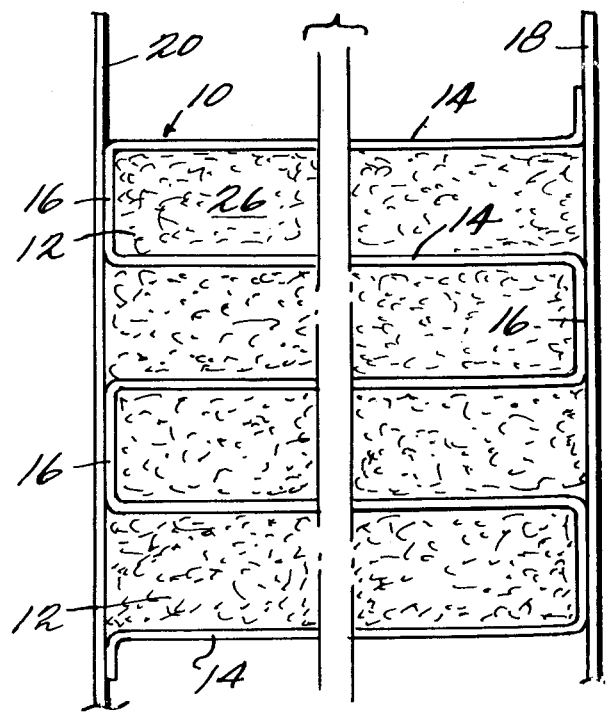
FIG. 5 is a side view of a third embodiment of the present invention.

As indicated above, the basic corrugation structure of sheet 10 greatly reduces convection and conduction losses. The basic structure can be improved by reducing infra-red losses. FIG. 5 illustrates an alternative embodiment for reducing infra-red absorption. In this embodiment, sheet 10 is corrugated as before to form channels 12 with side portions 14 and bottom portions 16. Cover sheets 18 and 20 are attached to bottom portions 16.

To reduce infra-red radiation, very loose fiberglass or any other infra-red scattering and/or absorbing filler 26 may be placed in channels 12. The amount of fiberglass or the like necessary for this embodiment is much less than the amount of fiberglass necessary in conventional fiberglass insulation since channels 12 already stop convection and filler 26 is used only to scatter or absorb the infra-red radiation. Since filler 26 scatters or absorbs the infra-red radiation, the amount of grazing infra-red radiation which reflects out from the corrugated structure is greatly reduced.

Other fillers could be used such as paper fluff or plastic fibers.

Channels can be made in a variety of ways which are not critical to the invention as long as the channels are roughly of uniform shape. Sinusoidal, or even triangular channels 12 can be employed instead of the rectangular channels disclosed in FIGS. 1 through 5 of the present invention.

The manner of making corrugations in sheet 10 are well-known in the art. For example, each of the following patents teach a method of corrugating material:

U.S. Pat. No. 4,132,581—Swartz (1979)
U.S. Pat. No. 4,028,252—Morris (1977)
U.S. Pat. No. 3,920,496—Wilkinson et al (1975)
U.S. Pat. No. 3,785,914—King (1974)
U.S. Pat. No. 3,751,325—Edkvist (1973)
U.S. Pat. No. 3,540,079—Bush (1970)
U.S. Pat. No. 3,342,666—Hull (1967)
U.S. Pat. No. 3,265,550—Lindqvist (1966)
U.S. Pat. No. 3,150,576—Gewiss (1964)
U.S. Pat. No. 2,190,680—Rowe (1940).

Of particular interest is the Rowe reference, supra, which system can be adapted for a continuous production process. Grooves 22 or 24 in sheet 10 may be pressed into sheet 10 prior to corrugation by any manner well-known in the art.

Although only a few exemplary embodiments of this invention have been described in detail above, those skilled in the art would readily appreciate that many modifications are possible in the exemplary embodiments without materially departing from the novel teachings and advantages of this invention. For example, instead of employing an infra-red absorptive coating on the surface of sheet 10, and infra-red scattering coating, such as crystalline salt, would produce comparable results.

Accordingly, all such modifications are intended to be included within the scope of this invention as defined in the following claims.

What is claimed is:

1. Apparatus for preventing heat to flow from a first area to a second area comprising:
   a corrugated sheet including a plurality of side portions, each of said side portions having a first edge proximate said first area and a second edge proximate said second area, pairs of adjacent side portions defining a plurality of channels, each of said channels having a length substantially parallel to said side portions and extending between said first and second edges, and a thickness, said length being at least four times greater than said thickness;
   said side portions having grooves for increasing the angle of incidence of infra-red radiation radiated from said sheet to enhance absorption and decrease reflection; and
   means for preventing convection between said channels.

2. Apparatus for preventing heat to flow from a first area to a second area comprising:
   a corrugated sheet including a plurality of side portions, each of said side portions having a first edge proximate said first area and a second edge proximate said second area, pairs of adjacent side portions defining a plurality of channels, each of said channels having a length substantially parallel to said side portions and extending between said first and second edges, and a thickness, said length being at least four times greater than said thickness;
   said side portions having grooves running parallel to said corrugations, said grooves increasing the angle of incidence of infra-red radiation radiated from said sheet to enhance absorption and increase reflection; and
   means for preventing convection between said channels.

3. Apparatus as in claim 2 further comprising a coating on said corrugated sheet absorptive of infra-red radiation and transparent to visible radiation.

4. Apparatus as in claim 1 or 2 wherein said corrugated sheet is paper.

5. Apparatus for preventing heat to flow from a first area to a second area comprising:
   a corrugated sheet including a plurality of side portions, each of said side portions having a first edge proximate said first area and a second edge proximate said second area, pairs of adjacent side portions defining a plurality of channels, each of said channels having a length substantially parallel to said side portions and extending between said first and second edges, and a thickness, said length being at least four times greater than said thickness;
   said side portions having grooves perpendicular to said corrugation, said grooves increasing the angle of incidence of infra-red radiation radiated from said sheet to enhance absorption and decrease reflection; and
   means for preventing convection between channels.

6. Apparatus as in claim 5 wherein said corrugated sheet is transparent to visible light.

7. Apparatus as in claim 6 wherein said corrugated sheet is plastic.

8. Apparatus as in claim 1, 2 or 5 wherein said preventing means are cover sheets of the same material as said corrugated sheet.

9. Apparatus as in claim 8 wherein each of said channels is further defined by a bottom portion, said cover sheets being attached to said bottom portions.

10. Apparatus as in claim 5 wherein said corrugated sheet is plastic.

11. Apparatus for preventing heat to flow from a first area to a second area comprising:
    a corrugated sheet defining a plurality of channels, each of said channels having a length extending substantially parallel to said channel and between said first area and said second area, and a thickness, said length being at least four times greater than said thickness;
    means, coating said sheet, for absorbing infra-red radiation; and
    means for preventing convection between said channels.

12. Apparatus for preventing heat to flow from a first area to a second area comprising:
    a corrugated sheet defining a plurality of channels, each of said channels having a length extending substantially parallel to said channel and between said first and second areas, and a thickness, said length being at least four times greater than said thickness;
    means for preventing convection between said channels; and
    filler means within said channels for scattering infra-red radiation.

13. Apparatus as in claim 1 or 12 wherein said channels are rectangular.

14. Apparatus as in claim 11 or 12 wherein said corrugated sheet includes a plurality of side portions, each of said side portions having a first edge proximate said first area and a second edge proximate said second area, said side portions having grooves parallel to said corrugations.

15. Apparatus as in claim 11 or 12 wherein said corrugated sheet includes a plurality of side portions, each of said side portions having a first edge proximate said first area and a second edge proximate said second area, said side portions having grooves perpendicular to said corrugations.

16. Apparatus for preventing heat to flow from a first area to a second area comprising:
   means for defining a plurality of channels including a plurality of side portions, each of said side portions having a first edge proximate said first area and a second edge proximate said second area, each of said channels having a length substantially parallel to said side portions and extending between said first and second edges, and a thickness, said length being at least four times greater than said thickness; and
   means for preventing convection between channels;
   said side portions having grooves for increasing the angle of incidence of infra-red radiation radiated from said defining and preventing means to enhance absorption and decrease reflection.

17. Apparatus as in claim 16 wherein said defining and preventing means are transparent to visible light.

18. Apparatus as in claim 17 wherein said defining and preventing means are plastic.

19. Apparatus as in claim 16 wherein said defining means is plastic.

20. Apparatus for preventing heat to flow from a first area to a second area comprising:
   means for defining a plurality of channels including a plurality of side portions, each of said side portions having a first edge proximate said first area and a second edge proximate said second area, each of said channels having a length substantially parallel to said side portions and extending between said first and second edges, and a thickness, said length being at least four times greater than said thickness; and
   means for preventing convection between channels;
   said side portions having grooves running perpendicular to said flow, said grooves increasing the angle of incidence of infra-red radiation radiated from said defining and preventing means to enhance absorption and increase reflection.

21. Apparatus as in claim 1, 16 or 20 wherein said grooves are accordion-like creases.

22. Apparatus for preventing heat to flow from a first area to a second area comprising:
   means for defining a plurality of channels including a plurality of side portions, each of said side portions having a first edge proximate said first area and a second edge proximate said second area, each of said channels having a length substantially parallel to said side portions and extending between said first and second edges and a thickness, said length being at least four times greater than said thickness; and
   means for preventing convection between channels;
   said side portions having grooves running parallel to said flow, said grooves increasing the angle of incidence of infra-red radiation radiated from said sheet to enhance absorption and decrease reflection.

23. Apparatus as in claim 1, 2, 16 or 22 wherein said grooves have an amplitude of 0.1 mm to 1 cm.

24. Apparatus as in claim 22 further comprising a coating on said defining means absorptive of infra-red radiation and transparent to visible radiation.

25. Apparatus as in claim 16 or 22 wherein said preventing means are sheets of the same material as said defining means and disposed on opposite ends of said channels and transverse to said length.

26. Apparatus for preventing heat to flow from a first area to a second area comprising:
   means for defining a plurality of channels, each of said channels having a length extending substantially parallel to said channels and between said first and second areas, and a thickness, said length being at least four times greater than said thickness;
   means, coating said defining means, for absorbing infra-red radiation; and
   means for preventing convection between channels.

27. Apparatus as in claim 1, 5, 12, 20 or 26 wherein the length of said channels is at least ten times greater than the thickness of said channels.

28. Apparatus as in claim 5, 11, 22 or 26 wherein said means for preventing convection includes a glass sheet.

29. Apparatus as in claim 22 or 26 wherein said defining means includes parallel side portions.

30. Apparatus as in claim 16 or 26 wherein said defining means is paper.

31. Apparatus for preventing heat to flow from a first area to a second area comprising:
   means for defining a plurality of channels, each of said channels having a length extending substantially parallel to said channels and between said first and second areas and a thickness, said length being at least four times greater than said thickness;
   means for preventing convection between channels; and
   filler means within said channels for scattering infra-red radiation.

32. Apparatus as in claim 26 or 31 wherein said defining means includes side portions, each of said side portions having a first edge proximate said first area and a second edge proximate said second area, said side portions having grooves perpendicular to said flow.

33. Apparatus as in claim 26 or 31 wherein said defining means includes side portions, each of said side portions having a first edge proximate said first area and a second edge proximate said second area, said side portions having grooves parallel to said flow.

* * * * *